United States Patent [19]

Squires

[11] Patent Number: 4,741,321
[45] Date of Patent: May 3, 1988

[54] PORTABLE BARBEQUE

[75] Inventor: Thomas E. Squires, Oakville, Canada

[73] Assignee: B. D. Wait Co. Limited, Oakville, Canada

[21] Appl. No.: 866,657

[22] Filed: May 27, 1986

[30] Foreign Application Priority Data

May 30, 1985 [CA] Canada .................................. 482852

[51] Int. Cl.$^4$ .............................................. F24C 1/16
[52] U.S. Cl. .................. 126/9 R; 126/25 R; 126/41 R
[58] Field of Search ............... 126/9 R, 9 B, 11, 25 R, 126/29, 30, 41 R; 99/447, 448, 449, 450

[56] References Cited

U.S. PATENT DOCUMENTS

| | | | |
|---|---|---|---|
| 2,477,529 | 7/1949 | Sprinkle | 126/9 R |
| 2,556,365 | 6/1951 | McKnight, Jr. | 126/9 R |
| 2,663,391 | 12/1953 | Kuhns | 126/25 R |
| 3,005,451 | 10/1961 | Richart | 126/9 R |
| 3,179,104 | 4/1965 | Chapman et al. | 126/9 R |
| 3,421,493 | 1/1969 | Miller | 126/9 R |
| 3,611,912 | 10/1971 | Choc | 126/9 R |
| 3,692,013 | 9/1972 | Grafton et al. | 126/41 R |
| 3,791,368 | 2/1974 | Hunt | 126/9 R |
| 3,806,987 | 4/1974 | Koziol | 126/25 R |
| 3,933,144 | 1/1976 | Bandy | 126/25 R |
| 4,192,283 | 3/1980 | Kridler et al. | 126/25 R |
| 4,426,990 | 1/1984 | Shepherd | 126/9 R |
| 4,446,846 | 5/1984 | Hahn | 126/25 R |
| 4,453,529 | 6/1984 | Spencer et al. | 126/9 R |
| 4,492,215 | 1/1985 | DiGianviborio | 126/21 R |
| 4,526,158 | 7/1985 | Lee | 126/9 R |
| 4,621,608 | 11/1986 | Lee | 126/9 R |

Primary Examiner—Samuel Scott
Assistant Examiner—H. A. Odar
Attorney, Agent, or Firm—Rogers & Scott

[57] ABSTRACT

This invention provides a portable barbeque having a base and a lid hinged to one another. A pair of allochiral feet are hinged to the bottom of the base and are arranged to lock to the base when deployed to support the base so that there is little likelihood of upsetting the structure. After use, the lid is closed and the feed can be dislodged and folded over the lid to hold the lid closed against the base and to store the feet. This invention also provides a base and a lid and a heat source contained in the base with grill support means inside the base. A shelf is supported in the base and has dividers between sections of the shelf to restrain movement of inert cinders placed on the shelf. A grill also supported by the base is spaced from the shelf such that the cinders are retained by the grill on the shelf should the housing be tilted or turned upside-down.

5 Claims, 4 Drawing Sheets

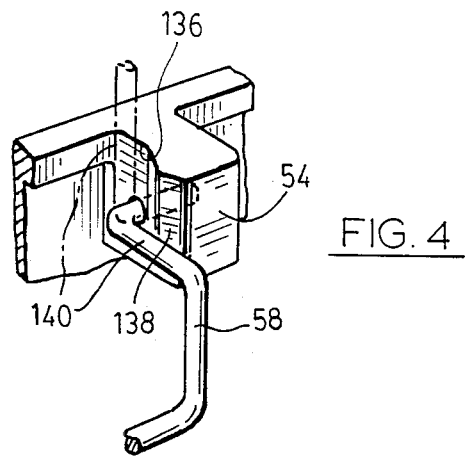
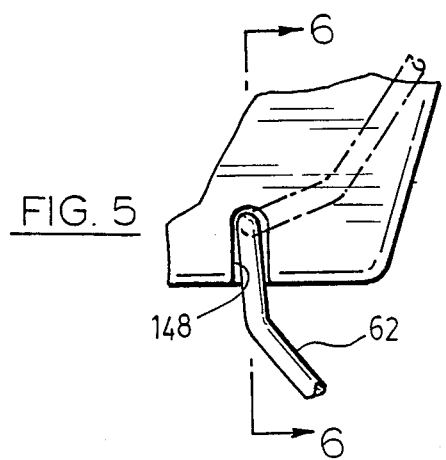
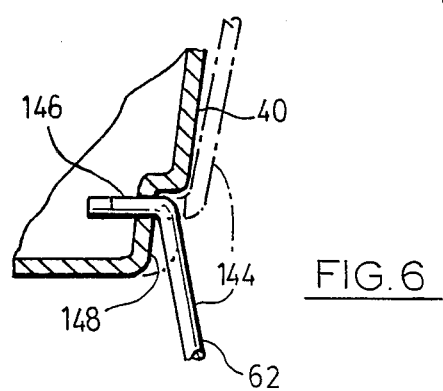

PORTABLE BARBEQUE

This invention relates to portable gas barbeques and more particularly to such a barbeque having structure to permit the barbeque to be carried in any position.

Barbeques have become very popular for outdoor cooking and are now quite sophisticated. The designs have evolved from the simple open barbeque in which a grill was placed above burning charcoal to cook meat to the present state of the art in which the structures are gas fired and use a heavy cast aluminum base and a lid. With these barbeques it is possible to perform most types of cooking and a variety of dishes.

With the advent of such advanced designs, a demand has developed for barbeques having the advantages of larger models while at the same time being portable for use by campers, picnickers, etc. Although many portable types have been designed, they have suffered drawbacks because they have almost invariably been designed by scaling down larger models and have not taken into consideration the special requirements inherent in portable structures.

The present invention is intended to provide a portable gas barbeque having many of the advantages of larger structures and which can be carried without regard to its orientation and which is secure and stable in use.

In one of its embodiments the invention provides a portable barbeque having a base and a lid hinged to one another. A pair of allochiral feet are hinged to the bottom of the base and are arranged to lock to the base when deployed to support the base so that there is little likelihood of upsetting the structure. After use, the lid is closed and the feet can be dislodged and folded over the lid to hold the lid closed against the base and to store the feet.

This and other aspects of the invention will be better understood with reference to the drawings, in which:

FIG. 4 is a perspective view of a portion of a carrying handle shown assembled in the barbeque;

FIG. 5 is an end view of a portion of the barbeque showing the attachment of a leg;

FIG. 6 is a sectional view on line 6—6 of FIG. 5;

Figure 1:
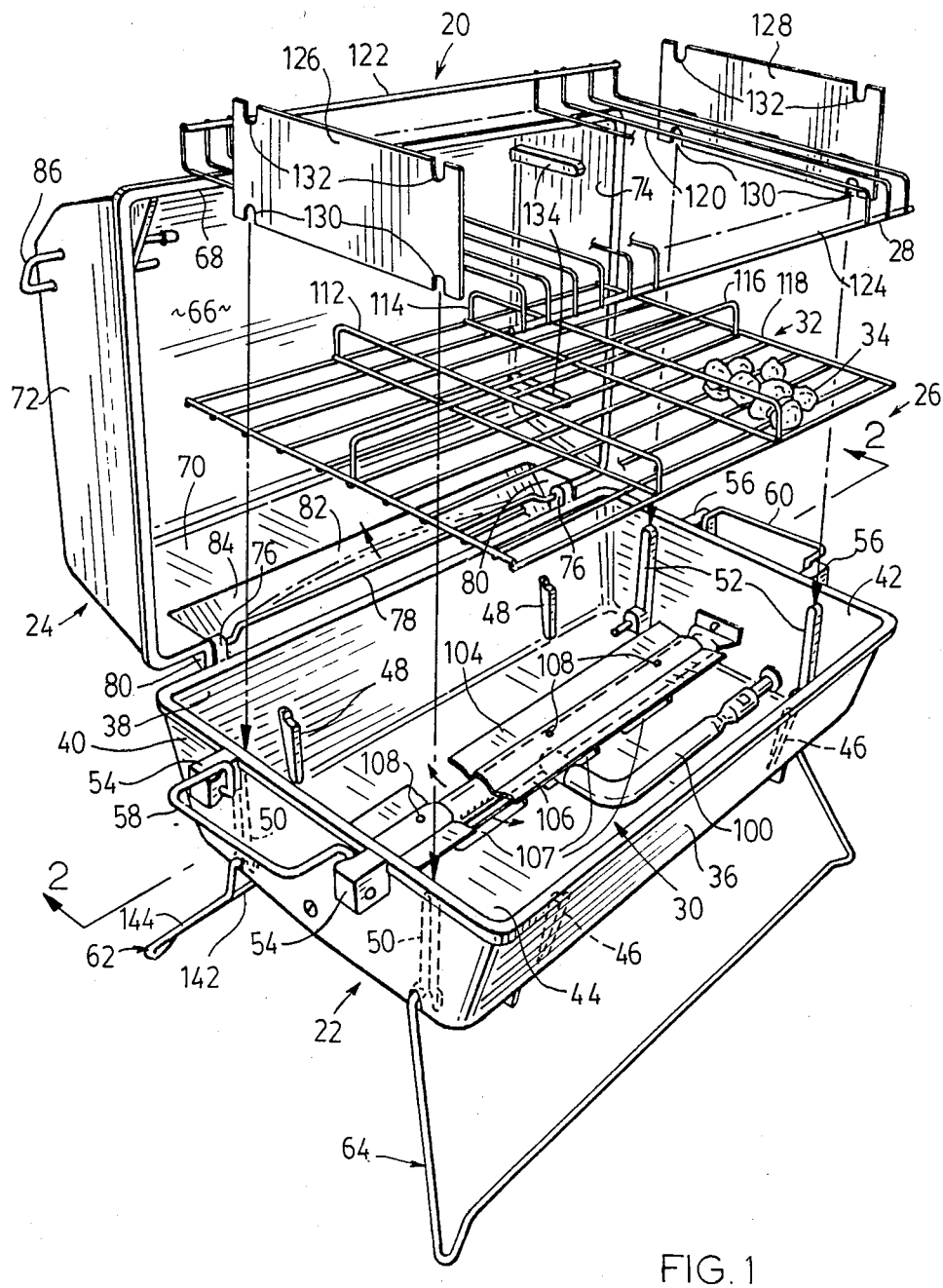
FIG. 1 is an exploded perspective view of a gas barbeque according to a preferred embodiment of the invention.

Reference is made first to FIG. 1 which illustrates a preferred embodiment of gas barbeques designated generally by the numeral 20 and consisting essentially of a base 22 having a lid 24 pivotally connected to the base and containing a heat source 26 and grill 28. The heat source consists of a gas burner assembly 30 attached inside the base 22 and a shelf 32 carrying inert cinders 34, such as natural lava.

The barbeque will be described in the arrangement shown in FIG. 1 as it would be used and subsequent description will concentrate on the details of the structure and how it is collapsed for carrying.

The base 22 has front 36, back 38, sides 40, 42 and bottom 44. The general arrangement as seen is rectangular in plan and the base is of cast aluminium and includes pairs of shelf supports 46, 48 on the front and back respectively of the base. Similarly, pairs of grill supports 50, 52 are formed on the sides 42.

On the outside, the base casting includes at its sides pairs of handle bosses 54, 56 to which respective handles 58, 60 are engaged. As will be described with reference to FIG. 4, these handles are arranged to remain in the position shown in FIG. 1 until dislodged by folding downwardly for storage.

Figure 8:
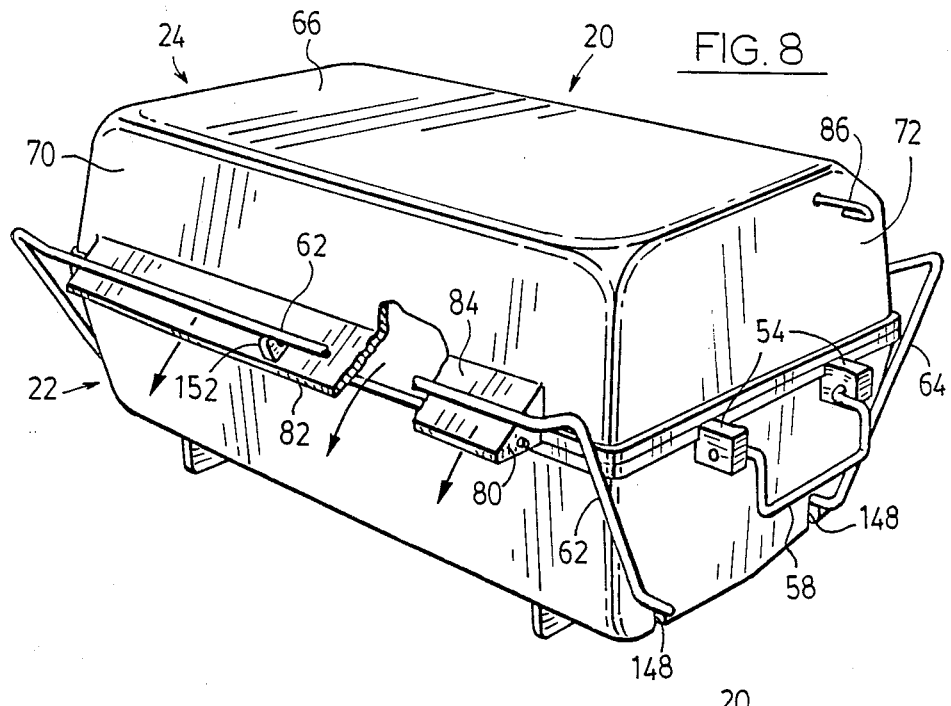
FIG. 8 is similar to FIG. 7 and looking from the other side and rear and having a portion broken away to illustrate an exhaust vent used to permit flow of air through the barbeque.
Figure 7:
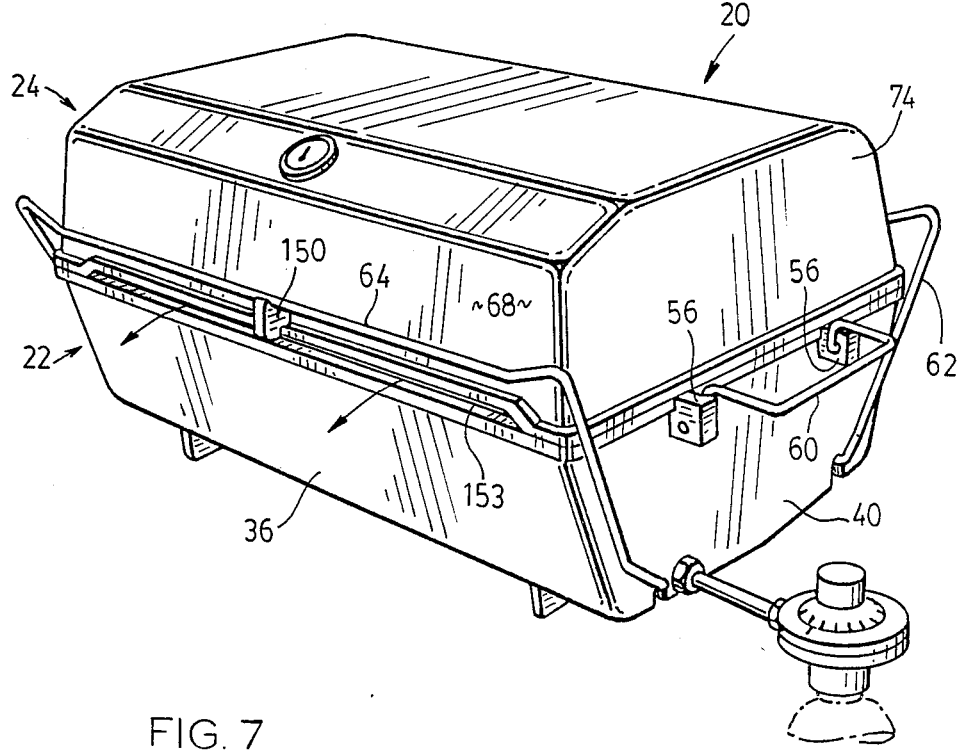
FIG. 7 is a perspective view of the barbeque in use and looking generally from the front and one side of the barbeque.

The base includes a pair of allochiral feet 62, 64 which are mounted in the base for pivotal movement between the supporting position shown in FIG. 1 and a storage position seen in FIGS. 7 and 8. The arrangement of the feet in the base will be described with reference to FIGS. 5 and 6.

Turning now to the lid 24, this is shaped to meet the base and close over the base to create an environment in which cooking can take place on the grill 28. The lid includes a top 66, front 68, back 70, and sides 72, 74 and is hinged to the base using a pair of lugs 76 (FIG. 1), formed on the back of the base. These lugs have aligned openings to receive a resilient axle 78 shaped to locate between the lugs and extending into openings formed in end sections 80 of a vent 82. This vent has a central section 84 formed continuously from the back 70 and blending into the end sections 80. As indicated in FIG. 1 in ghost outline, the resilient axle 78 can be deflected to withdraw the ends of the axle into the lugs thereby permitting the lid to be positioned. When the axle is released, the ends will enter the openings in the sections 80 and take up the solid line position. This simple arrangement provides for a very robust construction which nevertheless provides for separation of the lid from the base should this be necessary.

Figure 3:
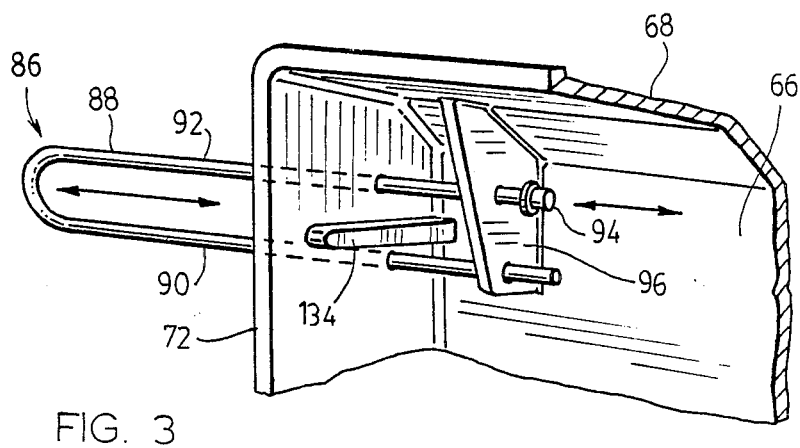
FIG. 3 is a perspective view of a portion of a lid of the barbeque to illustrate a lifter handle used with the lid.

The lid 24 is provided with a lifter handle 86 which is slidably engaged through the side 72 in a manner which is better seen in FIG. 3. The handle consists of a U-shaped element 88 having a first leg 90 slightly longer than the second leg 92 which receives a stop 94 of the type used as a wheel retainer on the end of an axle. The stop 94 is provided to engage a web 96 which has openings in alignment with openings in the side 72 so that the handle can be moved linearly outwardly and positioned ready for use. The handle is stored by pushing it as far as it will go into the lid. Preferably the legs 90, 92 are biased slightly apart so that when they are engaged in the lid there is friction between these legs and the openings containing the element 88. The handle will then move only when urged positively from one position to another.

Figure 2:
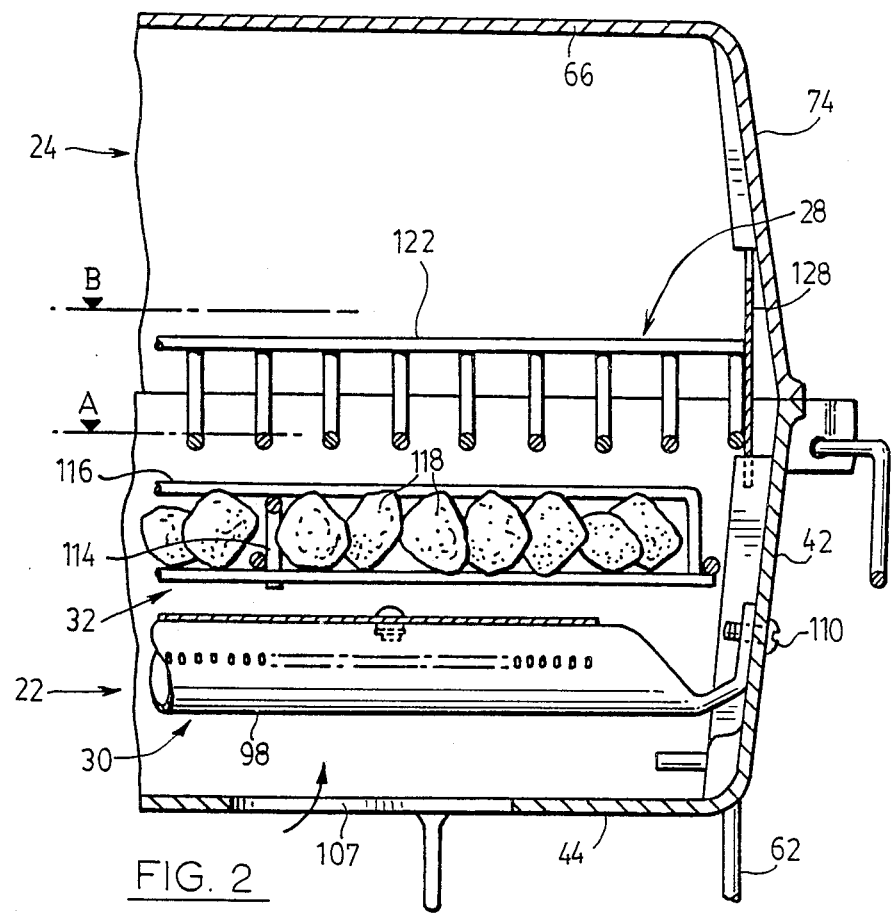
FIG. 2 is a sectional view taken generally on line 2—2 of FIG. 1 and showing parts of the assembled barbeque.

Reference is next made to FIGS. 1 and 2. The burner 30 includes a tubular section 98 fed from an inlet pipe 100 and having gas outlet openings 102 which create flame under deflector plates 104, 106. Air is inspired through bottom openings 107. The deflector plates are formed from a sheet metal strip attached by rivets 108 to the section 98. For simplicity, ends of the tubular section are flattened and deformed as best seen in FIG. 2 for positioning to receive screws 110 (one of which is seen) and which pass through the respective sides 40, 42.

Above the burner 30, and supported on the shelf supports 46, 48 is the shelf 32 made up of parallel rods spaced by welded transverse rods. The shelf also includes a pair of transverse upstanding retainers 112, 114 as well as a longitudinally extending retainer 116 made up from rods similar to those used for the rest of the shelf. These retainers are proportioned to prevent movement of cinders 118 across the shelf, the proportions being better seen in FIG. 2.

As also seen in FIGS. 1 and 2, the grill 28 rests on the supports 50, 52 and includes a center portion 120 made up of parallel rods and terminating in respective first and second upstanding portions 122, 124 which extend in opposite directions from the center portion 120. In the position shown, the portion 122 stands to prevent food products being pushed over the back of the grill when they are being manipulated using a spatula or the like. The grill is completed by a pair of side plates 126, 128 attached to the opposite ends of the center portion asymmetrically with reference to the center portion. Consequently in the position shown there is less of these plates below the center portion than above by a difference equivalent to the amount of variation required between two grill heights indicated at "A" and "B" in FIG. 2, as will be described in more detail later.

The plates 126, 128 include pairs of locating recesses 130, 132 which in the position shown are respectively at the bottoms and tops of these plates. Consequently, if the grill is lowered into the base, the recesses 130 will engage about the tops of the supports 50, 52. This will set the position of the grill at "A" as seen in FIG. 2. The space between the center portion and the retainers 114, 116 is then such that the cinders 118 cannot pass over the retainers because they are restrained by the underside of the grill. This is the position for carrying the structure and, to prevent the grill lifting during transportation it will be seen that the lid includes four cast abutments 134 (two of which are seen in FIG. 1) and which, as seen in FIG. 2, engage the tops of the plates 126, 128 to retain the grill in position.

During use it is possible to lift the grill and turn it over from back to front whereupon the grill will rest on the supports 50, 52 with the recesses 132 in engagement. Because of the asymmetric connection of the plates 126, 128 to the center portion of the grill, the center portion will now stand higher at level "A" (FIG. 2) and further away from the cinders 118. Also the grill portion 124 will be at the back of the barbeque to act in preventing food falling off the back of the grill. The arrangement is therefore such that while carrying the structure the grill is positioned at the "A" level to ensure that the cinders remain in position and then during cooking it can be used at either the "A" or "B" levels.

Reference is made next to FIG. 4 which shows some of the detail of handle 58 and in particular its relationship to boss 54. It will be seen that the boss 54 defines a shallow recess 136 extending vertically and that in the position shown, the handle is rubbing on the shoulder 138 which deflects the handle away from the recess 136. When the handle is lifted into the position shown in FIG. 1, the portion 140 of the handle is aligned with the recess 146 and, because the handle portion 140 and corresponding portion at the other side of the handle are biased outwardly, the portion 140 sits in the recess 136 and tends to remain there because energy is required to deflect this portion if the handle is to be moved downwardly. Consequently the handles 58, 60 (see FIG. 1) will remain in the operational position shown until deflected downwardly for storage into the position seen in FIG. 8.

Turning now to FIG. 5 in combination with FIG. 1, the allochiral feet have similar mirror-image shapes and foot 62 will be described as being typical of both feet. As seen in FIG. 1 the foot 62 includes a center portion 142 and a pair of end portions 144 (one of which is seen).

Turning to FIG. 6, the end portion 144 terminates in a stub 146 extending through an opening formed in the side 40 and journalled for angular movement in this opening. The side 40 is also shaped adjacent the opening with a downwardly extending and opening channel 148 which, as seen in FIG. 5, with the foot in the supporting position, contains part of the end portion 144 of the foot 62. The feet are biased such that this engagement will take place naturally and the feet are then locked in position to provide support in a positive manner with little likelihood of accidental displacement. When it is desired to fold the feet, the end portions of an individual foot are deflected outwardly using a hand on each of the portions, and once disengaged from the corresponding channels, the foot can be folded allowing the barbeque to come down on the supporting surface at that side. This is repeated for the other foot so that the barbeque now stands on the supporting surface and the feet can be folded upwardly reaching a positions best seen in FIGS. 7 and 8.

As seen in FIG. 7, the foot 64 has been engaged over a lip 150 formed integrally in the lid and, as seen in FIG. 8, the leg 62 is engaged over a lip 152 formed on the outside of the vent 82. FIG. 7 also shows a narrow gap 153 between the fronts of the top and base to complement the vent 82 (FIG. 1) for further air movement.

With the aforementioned details in mind, it will now be understood how the portable barbeque is arranged for storage or transportation. First of all the gas supply (seen in FIG. 7) will be disconnected and then the grill will be positioned as shown in FIGS. 1 and 3 to contain the cinders. The lid can then be closed using the lifting handle 86, and on closing, the handle can be stored by pushing it longitudinally into the lid. Next, the feet are dislodged from the FIG. 1 position so that they can be stored as shown in FIGS. 7 and 8 and, if preferred, the handles can be dislodged into hanging or storage positions shown in FIG. 8. If it is desired to move the barbeque, even if it still retains some heat, it is possible to lift using one or both of the handles 58, 60 without fear of losing the cinders or disarranging parts inside the barbeque.

I claim:

1. A housing for a portable barbeque comprising:
   a base being generally rectangular in plan and having front, back, sides and a bottom for containing a heat source and grill, the sides defining pairs of openings adjacent the bottom, each one of the openings in one side being axially aligned with the other opening of the pair in the other side, and channels extending downwardly from the openings to the bottom ends of the sides;
   a lid shaped to cover the base and having a back, front and sides, the back of the lid being pivotally connected to the back of the base;
   a pair of allochiral feet, each of the feet having a center portion and a pair of opposed end portions extending generally parallel to one another and terminating in aligned stubs projecting towards one another, the center portion being stressed to bias the stubs towards one another, and the feet being engaged one in each of the pairs of aligned openings with the stubs journalled for rotation in the openings so that with the legs extending downwardly in a supporting position, the end portions of the legs are engaged in the respective channels to lock the legs and prevent rotation, and such that upon deflecting the end portions of the legs outwardly, these portions leave the corresponding channels to permit the legs to be rotated to bring the center portions into engagement with the lid in a storage position; and means coupled to the lid to retain the legs in the storage position whereby the lid is retained on the base.

2. A housing as claimed in claim 1 in which the base further comprises:

a pair of carrying handles; and means coupling the handles to the sides of the base for movement between a stored position in which the handles hang downwardly and an operational position in which the handles extend outwardly to permit the user to carry the housing using one or both of the handles, said coupling means further comprising means resiliently retaining the handles in the operational position.

3. A housing as claimed in claim 1 and further comprising a lifter handle for lifting the lid during use, the lifter handle being slidably engaged in one of the sides of the lid adjacent to the front of the lid for movement linearly between an inner position in which the lifter handle is stored almost comletely in the lid and an outer position in which the handle extends from the lid and is exposed sufficiently for the user to grip the handle for lifting the lid.

4. A housing as claimed in claim 1 in which the pivotal connection between the base and lid comprises:

a pair of spaced lugs attached to the base at the top of the back of the base and each lug defining one of a pair of axially aligned openings;

a vent at the bottom of the back of the lid, the vent defined by a pair of end sections spaced apart sufficiently to just contain the lugs, and a center section extending from the back and between the end sections and terminating at an outer edge, each of the end sections defining one of a pair of axially aligned openings; and pivot means engaged in the lug openings and projecting beyond the lugs and into the openings in the end sections whereby the lid can be rotated about the pivot means relative to the base to open the housing, the spacing between the center section and the back of the base providing clearance for air flow and the edge of the center section engaging the back of the base with the lid fully open to stop further movement of the lid and so that the lid is standing open in a position of stable equilibrium.

5. A housing for a portable barbeque comprising:

a base being generally rectangular in plan and having front, back, sides and a bottom for containing a heat source and grill;

a lid shaped to cover the base and having a back pivotally connected to the back of the base;

a heat source contained in the base;

grill support means on insides of the ends of the base;

a grill having a center section of rods, a first side section projecting out of the plane of the center section at one side of the grill and a parallel second side section projecting out of the plane of the center section in a direction opposite to that of the first side section and at the other side of the grill;

a pair of support elements attached to respective ends of the center section and having first and second engagement means for selectively resting on the grill support means, the engagement means being set at two different vertical spacings from the center section so that with the first engagement means on the grill support means, the center section of the grill is at a lower position with said first side section adjacent the back of the base and projecting upwardly, and so that with the second engagement means resting on the grill support means, the center section of the grill is at an upper position with said second side section adjacent the back of the base and projecting upwardly.

* * * * *